United States Patent [19]
Omi et al.

[11] Patent Number: 5,592,335
[45] Date of Patent: Jan. 7, 1997

[54] REDUCED DIAMETER CAMERA LENS BARREL WITH LENS SHIFT DEVICE AND IMPROVED FOCUS LENS DRIVE LINKAGE

[75] Inventors: Junichi Omi, Kawasaki; Hidenori Miyamoto, Urayasu; Minoru Katou, Kawasaki, all of Japan

[73] Assignee: Nikon Corporation, Tokyo, Japan

[21] Appl. No.: 216,283

[22] Filed: Mar. 23, 1994

[30] Foreign Application Priority Data

Mar. 23, 1993 [JP] Japan ................... 5-088009
May 15, 1993 [JP] Japan ................... 5-136739

[51] Int. Cl.$^6$ ................... G02B 15/14; G02B 7/02; G02B 9/00
[52] U.S. Cl. ................... 359/695; 359/696; 359/813; 359/822; 359/740
[58] Field of Search ................... 359/738, 739, 359/740, 695, 822, 813, 814, 696; 354/195.11

[56] References Cited

U.S. PATENT DOCUMENTS

| | | | |
|---|---|---|---|
| 4,260,223 | 4/1981 | Hamanishi | 359/740 |
| 4,367,927 | 6/1983 | Fujii | 359/740 |
| 4,432,615 | 2/1984 | Ikemori | 359/740 |
| 4,464,023 | 8/1984 | Kato | 359/740 |
| 4,466,710 | 8/1984 | Kato | 359/740 |
| 4,901,096 | 2/1990 | Lemelson | 354/268 |
| 4,965,619 | 10/1990 | Shikaumi et al. | 354/410 |
| 5,079,575 | 1/1992 | Nii | 354/195.11 |
| 5,101,230 | 3/1992 | Shikaumi et al. | 354/430 |
| 5,164,860 | 11/1992 | Suzuki | 359/696 |
| 5,172,276 | 12/1992 | Ueyama | 359/813 |
| 5,177,639 | 1/1993 | Kohmoto | 359/738 |
| 5,210,563 | 5/1993 | Hamada et al. | 354/400 |
| 5,264,966 | 11/1993 | Okada | 359/694 |
| 5,282,090 | 1/1994 | Suzuki | 359/696 |
| 5,313,329 | 5/1994 | Ueda | 359/676 |

FOREIGN PATENT DOCUMENTS 2-282717  11/1990  Japan .
2-304535  12/1990  Japan .

*Primary Examiner*—Georgia Y. Epps
*Assistant Examiner*—Ricky Mack
*Attorney, Agent, or Firm*—Oliff & Berridge

[57] ABSTRACT

A camera lens barrel for a camera includes first, second, third and fourth lens groups with a diaphragm located between the second and third lens groups. The second and third lens groups are connected, while the first, third and fourth lens groups can move relative to each other along the optical axis of the camera lens barrel. A diaphragm driver is positioned radially outside of the second lens group, while a lens shift driver device, including the horizontal and vertical lens shift drivers, is positioned radially outside of the third lens group. The diaphragm driver and the lens shift driver device are connected to a control unit via a flexible printed circuit. A power transmission extends from the diaphragm driver to the fourth lens group. The power transmission is connected to the diaphragm driver via a pin. When the pin is rotated, the angular rotation of a pin is transmitted to the fourth lens group to focus the camera lens barrel. Thus, the overall diameter of the camera lens barrel is reduced.

16 Claims, 8 Drawing Sheets

REDUCED DIAMETER CAMERA LENS BARREL WITH LENS SHIFT DEVICE AND IMPROVED FOCUS LENS DRIVE LINKAGE

BACKGROUND OF THE INVENTION

1. Field of the Invention

This invention relates to a camera lens barrel having a reduced diameter. In particular, this invention is drawn to a camera lens barrel having a lens shift means and a lens shift drive means for moving a lens group of the camera lens barrel in a direction perpendicular to the optical axis of the camera lens barrel.

2. Related Art

In the conventional camera lens barrels where one of the lens groups can be shifted in a direction perpendicular to the optical axis of the lens barrel, the lens drive mechanism is separated into a lens shift mechanism and a lens shift driver. The lens shift driver in the conventional camera lens barrel is attached to the main body of the camera. A shift drive transmission is used to transmit shift drive power from the lens shift driver to the lens shift mechanism, which is displaced from the lens shift driver along the optical axis. This shift drive transmission has an axis of rotation which is parallel to the optical axis. Rotation of the shift drive transmission transmits power from the lens shift driver the lens shift mechanism. Such a conventional camera lens barrel is disclosed in, for example, Japan Published Patent Application 3-110530.

In this conventional camera, the shift drive transmission transmits the shift drive power regardless of the shift state of the shiftable lens group. Thus, in this conventional camera, it has been necessary to place the shift drive transmission radially outside of, or further from, the optical axis than the diaphragm driver and the lens shift mechanism. As a result, the diameter of the camera lens barrel is significantly increased.

In addition, when the camera lens barrel includes a zoom lens, the focusing lens driver, which is used to move the focusing lens group along the optical axis, is located on the outer surface of the focusing lens group. However, the focusing lens group tends to be relatively larger in diameter than the other lens groups of the zoom lens. Thus, when the focusing lens driver is located on the outer perimeter of the focusing lens group, the already enlarged diameter of the camera lens barrel grows even larger. These enlarged camera lens barrels become unwieldy and difficult to use.

SUMMARY OF THE INVENTION

Thus, this invention provides a camera lens barrel having a reduced diameter.

This invention further provides for a camera zoom lens barrel having a reduced diameter.

This invention further provides for a camera lens barrel having a separate diaphragm driver and a separate lens driver which are separated along the optical axis of the camera lens barrel.

This invention also provides for the diaphragm driver to be positioned in front of the diaphragm and the lens driver to be positioned in back of the diaphragm relative to the optical axis.

This invention further provides for a drive power transmission transmitting drive power from the diaphragm driver to the focusing lens group.

These and other objectives of this invention are achieved by eliminating the shift drive transmission of the conventional camera lens barrel, which must be placed outside of the diaphragm drive means. These and other objectives of this invention are also achieved by replacing the focusing driver, which is located on the outer perimeter of the focusing lens group in the conventional zoom camera lens barrel, with a drive power transmission which transmits power from the diaphragm driver to the drive mechanism of the focusing lens group.

DETAILED DESCRIPTION OF THE PREFERRED EMBODIMENTS

Figure 1:
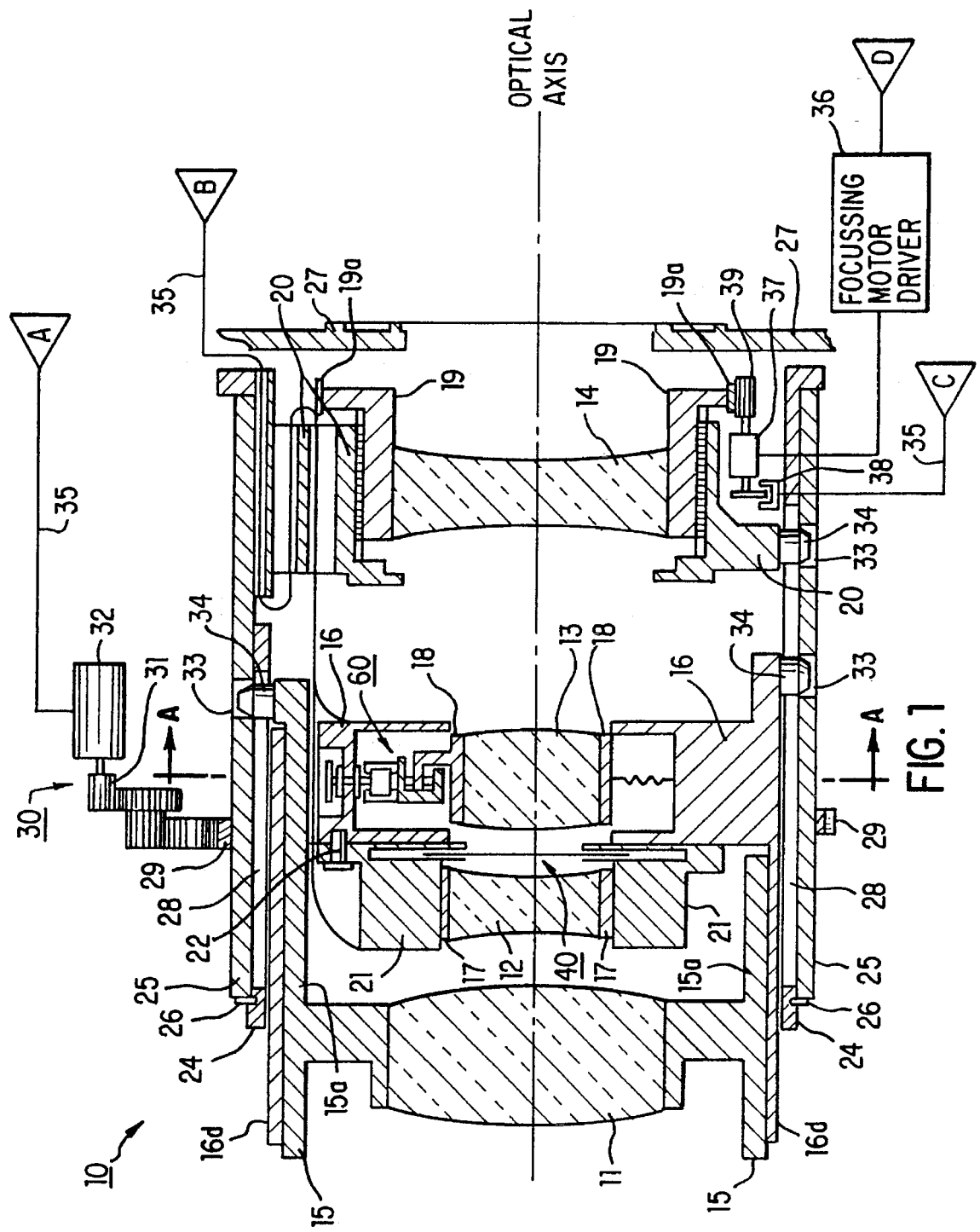
FIG. 1 shows a cross section of a camera lens barrel according to a first embodiment of the invention.
Figure 2:
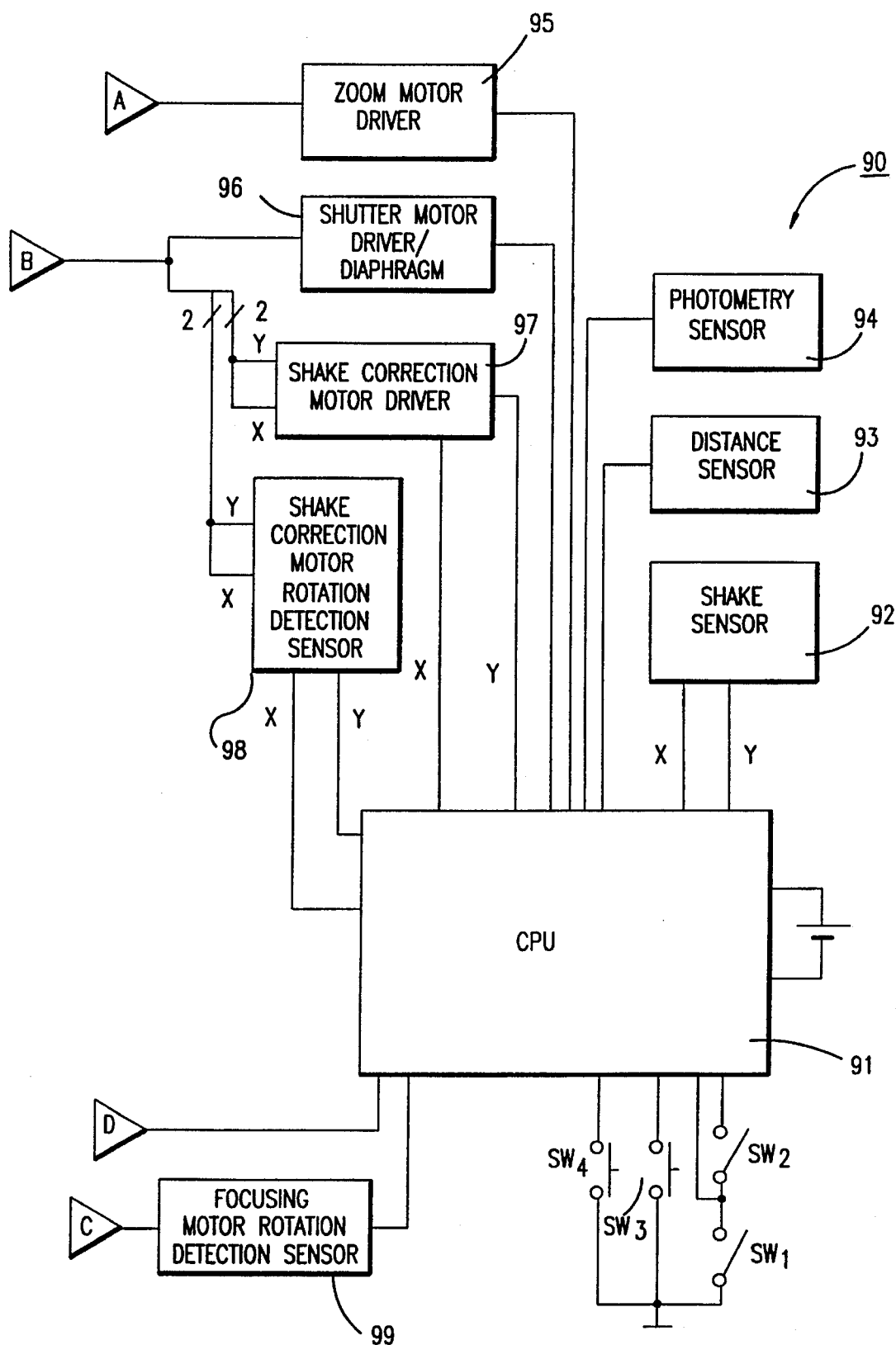
FIG. 2 shows a control mechanism for a camera lens barrel of the first preferred embodiment.

FIGS. 1 and 2 show a first preferred embodiment of this invention. As shown in FIG. 1, a camera barrel 10 includes a first lens group 11 positioned at a cap end of the camera lens barrel 10, a second lens group 12 and a third lens group 13 positioned in the interior of the camera lens barrel 10, and a fourth lens group 14 positioned at a film of the camera lens barrel 10.

The third lens group 13 is a shiftable lens group which can be shifted in a vertical direction and in a horizontal direction. The shiftable lens group 13 is shifted to compensate for vibrations, shakes and other transient motions on the camera lens barrel. The fourth lens group 14 is a focusing lens group for focusing the image projected through the camera lens barrel 10 onto the film.

The body of the camera lens barrel 10 is formed by a fixed tube 24. A number of slot-like straight guide holes 28 are formed in the fixed tube 24. The guide holes 28 are distributed around the circumference of the fixed tube 24 and extend in a longitudinal direction parallel to the optical axis of the camera lens barrel 10.

The fixed tube 24 is inserted into a cam tube 25. A ring 26 is fitted onto the fixed tube 24 near the lens cap end of the camera lens barrel 10 and extends radially outwardly from the optical axis. An annular portion projects from the film end of the fixed tube 24. The ring 26 and the annular projection ensure that the cam tube 25 is maintained in a fixed position along the optical axis relative to the fixed tube 24.

A toothed ring gear 29 is attached to an outer surface of the cam tube 25 and completely encircles the cam tube 25. The ring gear 29 is connected to a gear train 30, which in turn is connection to a pinion gear 31. The pinion gear 31 is connected to a zoom motor 32. When the zoom motor 32 rotates, the pinion gear 31 drives the gear train 30, which in turn drives the ring gear 29 and thus the cam tube 25. Thus, as the zoom motor 32 rotates, the cam tube 25 also rotates.

The first lens group 11 is mounted in a first lens chamber 15. The second lens group 12 is mounted in a second lens chamber 17. The second lens chamber 17 is in turn mounted on the shutter driver 21. The shutter driver 21 opens and closes the shutter mechanism 40. The shutter driver also functions as the diaphragm for the camera lens barrel 10. The shutter mechanism 40 is shown in greater detail in FIGS. 7 and 8.

The third lens group 13 is positioned in a third lens chamber 18. The third lens chamber 18 is in turn mounted onto a first lens base plate 16 through a pair of lens shift mechanisms 60. FIG. 1 shows only one of the pair of lens shift mechanisms 60. The lens shift mechanism 60 shown in FIG. 1 shifts the third lens group 13 in the vertical direction and allows it to move freely in the horizontal direction perpendicular to the optical axis. The other shift mechanism 60 is hidden behind the third lens group 13 and shifts the third lens group 13 in the horizontal direction perpendicular to the optical axis. The shutter driver 21 is mounted onto the first lens base plate 16 using at least one bolt 22.

As shown in FIG. 1, the first lens base plate 16 is fitted into the fixed tube 24. The first lens base plate 16 also has an extended annular portion 16a which extends beyond the cap end of the fixed tube 24.

The first lens chamber 15 is positioned on the cap end side of the second and third lens groups 12 and 13 and fitted inside of the extended annular portion 16a of the first lens base plate 16. The first lens chamber 15 also has an extended annular portion 15a, which extends from the lens chamber 15 toward the film end of the lens camera barrel 10. As shown in FIG. 1, at least a portion of the extended annular portion 15a of the first lens chamber 15 extends through a slot formed in the first lens base plate 16.

The fourth lens group 14 is mounted on a fourth lens chamber 19. The fourth lens chamber 19 is in turn mounted on a second lens base plate 20. The outer peripheral surface of the fourth lens chamber 19 and the inner peripheral surface of the second lens base plate 20 are threaded. Thus, the fourth lens group 14 can be moved along the optical axis relative to the second lens base plate 20 by rotating it relative to the second lens plate 20.

Each of the first lens base plate 16, the first lens chamber 15 and the second lens base plate 20 has a cam follower 34 extending radially outwardly from it. Each of the cam followers 34 extends through one of the slots 28 in the fixed tube 24 and into a cam groove 33 formed in the cam tube 25. The cam grooves 33 spiral around the cam tube 25. Accordingly, as the cam tube 25 is rotated by the zoom motor 32, the relative positions between the first lens group 11, and the second lens group 12/third lens group 13, and the fourth lens group 14 change as the cam followers 34 are moved in the cam grooves 33 along the optical axis of the camera lens barrel 10. That is, the cam grooves 33 rotate relative to the cam followers 34.

Simultaneously, the fourth lens group 14, the focusing lens group, is rotated by the focusing motor 37, which is driven by the focusing motor driver 36. As the focusing motor 37 rotates, the pinion gear 39, which is connected to the toothed outer portion 19a of the fourth lens chamber 19, rotates the fourth lens group 14. Since the outer surface of the fourth lens chamber 19 and the inner surface of the second base plate 20 are threaded, rotating the fourth lens chamber 19 causes it to move laterally along the optical axis relative to the second lens base plate 20, thus focusing the image onto the film of the camera. At the same time that the focusing motor driver 36 drives the focusing motor 37, a rotary position encoder mechanism 38, comprising a disk and a horseshoe shaped reader, outputs a signal indicative of the rotation of the fourth lens group 14 on the signal line 35 to the control apparatus shown in FIG. 2.

Likewise, the zoom motor 32 receives its drive signals on a signal line 35 from the control system shown in FIG. 2. Finally, the shutter driver 21 and the two shift mechanisms 60 are connected to the control system shown in FIG. 2 through a control line 39. The control line 39 comprises a flexible printed circuit (FPC). As shown in FIG. 1, the FPC control line 39 passes through a pair of slots formed in the second lens base plate 20 and a slot formed in the lens base plate 16.

FIG. 2 shows the control system for the first preferred embodiment. The CPU 91 is mounted inside the body of the camera (not shown). The distance sensor 93 determines the distance between the camera and the subject to be photographed and operative signal indicative of this distance to the CPU 91.

Based on this distant signal, the CPU 91 determines the desired position of the focusing lens group 14 necessary to properly focus the image of the subject onto the film of the camera. Based on the known present position of the focusing lens group 14, the CPU 91 outputs a drive signal to the focusing motor driver 36 to rotate the focusing lens group 14 and move it to the desired position. The amount of rotation applied to the focusing lens group 14 is measured by the rotary encoder 38, which outputs a signal to the focusing motor rotation detection sensor 99, which then outputs the signal to the CPU 91. Once the CPU 91 has determined that the focusing lens group 14 has moved to the desired position, it stops outputting the drive signal to the focusing motor driver 36.

Similarly, the photometry sensor 94 measures the current ambient light and outputs a signal indicative of this measurement to the CPU 91. The distance sensor 93 and the photometry sensor 94 generate their outputs whenever the switch SW1 is operated. Based on the output of the photometry sensor 94, the CPU 91 outputs a signal to the shutter motor/diaphragm driver 96, which outputs a signal to the shutter driver 21.

In addition, when the zoom switches SW4 and SW3 are operated, the CPU outputs drive signals to the zoom motor driver 95 which operates the zoom motor 32. Depending upon which of the switches SW4 and SW3 are operated, the zoom motor driver drives the zoom motor 32 either clockwise or counterclockwise.

Finally, the shake sensor 92 measures the shakes and vibrations applied to the camera and outputs signals indicative of the horizontal (x) direction motions and the vertical (y) direction motions. The motor driver 95 is then driven by signals from the CPU 91, which in turn operates the vertical and horizontal shake motors of the lens shift mechanisms 60. Likewise, rotary encoders connected to the motors of the lens shift mechanisms 60 output feedback signals through the shake correction motor rotation detection sensor 98 to the CPU 91.

Figure 9:
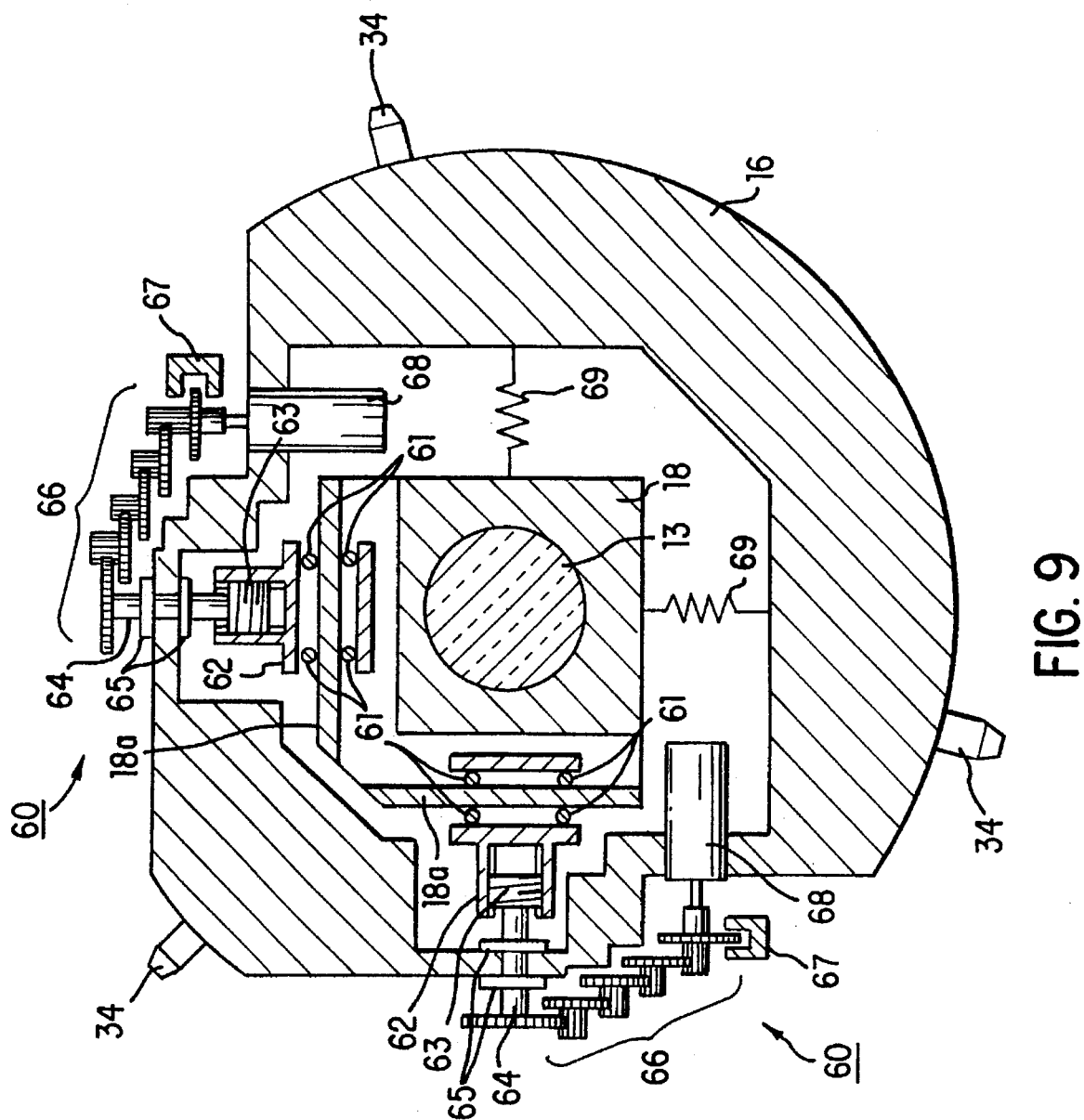
FIG. 9 shows a cross section of the shiftable lens group of the first and second embodiments.

FIG. 9 shows the lens base plate 16, the third lens chamber 18, the third lens group 13 and the vertical and horizontal lens shift mechanisms 60. As shown in FIGS. 1 and 9, the third lens chamber 18 has a pair of L-shaped arms which extend from a top side and a left side of the third lens chamber 18. A shift drive arm 62 is fitted around each of the L-shaped arms 18a. Four slider balls 61 are inserted between the inner surfaces of the U-shaped shift drive arms 62 and the outer surfaces of the axially extending portions of the L-shaped arms 18a. On the opposite sides of the third lens chamber 18 from the L-shaped arms 18a, a pair of springs 69 connect the third lens chamber 18 to the first lens base plate 16.

Thus, the third lens chamber 18 and the third lens group 13 are supported in the vertical direction between one of the shift drive arms 62 and one of the springs 69 and is likewise supported in the horizontal direction by the other one of the shift drive arms 62 and the other spring 69, as shown in FIG. 9. In addition, the slider balls 61 allow the third lens chamber 18 to move freely relative to each one of the shift drive arms 62 in the nonsupported directions.

Each of the U-shaped shift drive arms 62 has, on the side away from the third lens chamber 18, an annular portion having a threaded interior surface. A threaded portion 63 positioned on the bottom end of a shift drive shaft 64 is threaded into the annular portion of each shift drive arm 62. Each shift drive shaft 64 extends through the first lens base plate 16. While the shift drive shafts 64 can freely rotate, their lateral position relative to the first lens base plate 16 is fixed by a pair of flanges 65. At the end of each shift drive shaft 64 opposite to the threaded portion 63, a gear train 66 is attached. The gear train 66 comprises a main driven gear attached to a shift arm drive motor 68. The rotational motion of the shift arm drive motor 68 is reduced through three stages of the gear train 66 to a final gear of the gear train which is fixedly attached to the opposite end of the shift drive shaft 64. Finally, the driven gear attached to the shift arm drive motor 68 has a rotary encoder disk of a rotary encoder 67 attached to it. The rotary encoder disk interacts with a sensor of the rotary encoder 67 to provide feedback signals indicative of the amount of rotation of the corresponding shift arm drive motor 68.

The rotary encoder 67 converts the rotation of the shift arm drive motor 68 into a logical signal which is transmitted to the CPU 91. This electrical signal transmission and the transmission of drive power to the shift arm drive motors 68 is performed by the signal line 39. The signal line 39 is preferably a flexible printed circuit (FPC). The FPC 39 also transmits drive power to the shutter driver 21, as it is also connected to the camera shake correction motor driver 97 and the shutter motor/diaphragm driver 96, which functions as both the shutter motor driver and the diaphragm.

As described above, the X direction lens shift mechanism 60 is identical to the Y direction lens shift mechanism 60. The CPU 91 calculates the amount of camera shake correction based on the amount of camera shake and/or vibration in the X direction and the amount of camera shake and/or vibration in the Y direction. The camera shake sensor 92 determines the amount of camera shake in the X and Y directions. Based on the output of the camera shake sensor 92, the CPU 91 drives the X direction shift arm driver motor 68 and the Y direction shift arm drive motor 68 by the camera shake correction motor driver 97. Thus, camera shake correction is performed by driving the motor 68 so that the third lens chamber 9 and thus the third lens group 13 is shifted in the X and Y directions opposite to the shakes and/or vibrations detected by the shake sensor 92.

Shifting of the third lens group 13 in order to correct for camera shakes and/or vibrations must be accomplished in the direction which matches the direction detected by the camera shake sensor 92. When the camera shake sensor 92 is placed in a location different from that of the camera shake correction lens shift mechanisms 60, the determination as to whether or not there is a match between the detected direction of the shakes and/or vibrations, and the X and Y correction directions depends upon the amount of combined air from the components which are displaced between the camera shake correction lens shift mechanisms 60 and the camera shake sensor 92. In general, the greater number of components between these elements, the larger the combined air will be.

As explained, the structure of this first preferred embodiment is such that the diaphragm drive means (the shutter driver 21, which also functions as a diaphragm) and the lens shift drive means (the shift drive arms 62 and the shift drive shafts 64) are placed in front and in back of the diaphragm (the shutter plates), respectively, along the direction of the optical axis of the camera barrel.

Thus, the shift drive transmission means of the conventional camera lens barrel, which must be placed radially outside of the diaphragm and its related drive means, can be eliminated. Thus, the diameter of the lens barrel can be made smaller. In addition, by placing the heavier lens drive means closer to the main body of the camera than to the lighter diaphragm drive means, the amount of angular moment of inertia added to the hands of the photographer is reduced. This further reduces the amount of likely camera shake and/or vibration applied to the lens barrel.

With the camera lens barrel of the first preferred embodiment, the camera lens barrel is formed so that the diaphragm drive means is placed in front of the diaphragm and the lens drive means is placed in back of the diaphragm along the optical axis of the photographic lenses. In addition, by placing the diaphragm drive means in a position far from the photographic medium, and by placing the lens drive means close to the photographic medium, the angular moment of inertia applied by the camera lens barrel to the hands of the photographer is reduced, thereby reducing the amount of camera shake applied to the camera.

Figure 3:
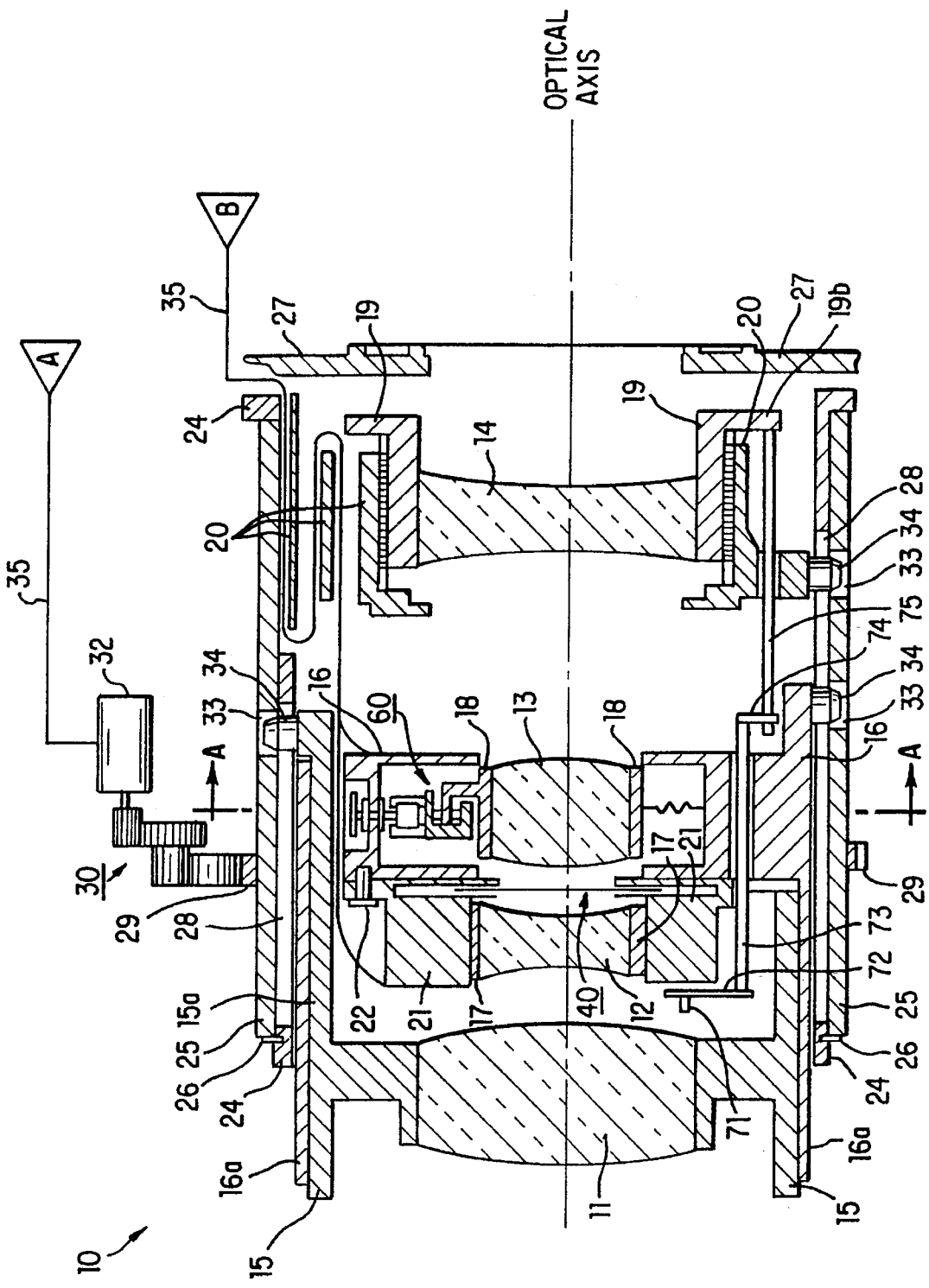
FIG. 3 shows a cross section of a camera zoom lens barrel of a second preferred embodiment of the invention.
Figure 4:
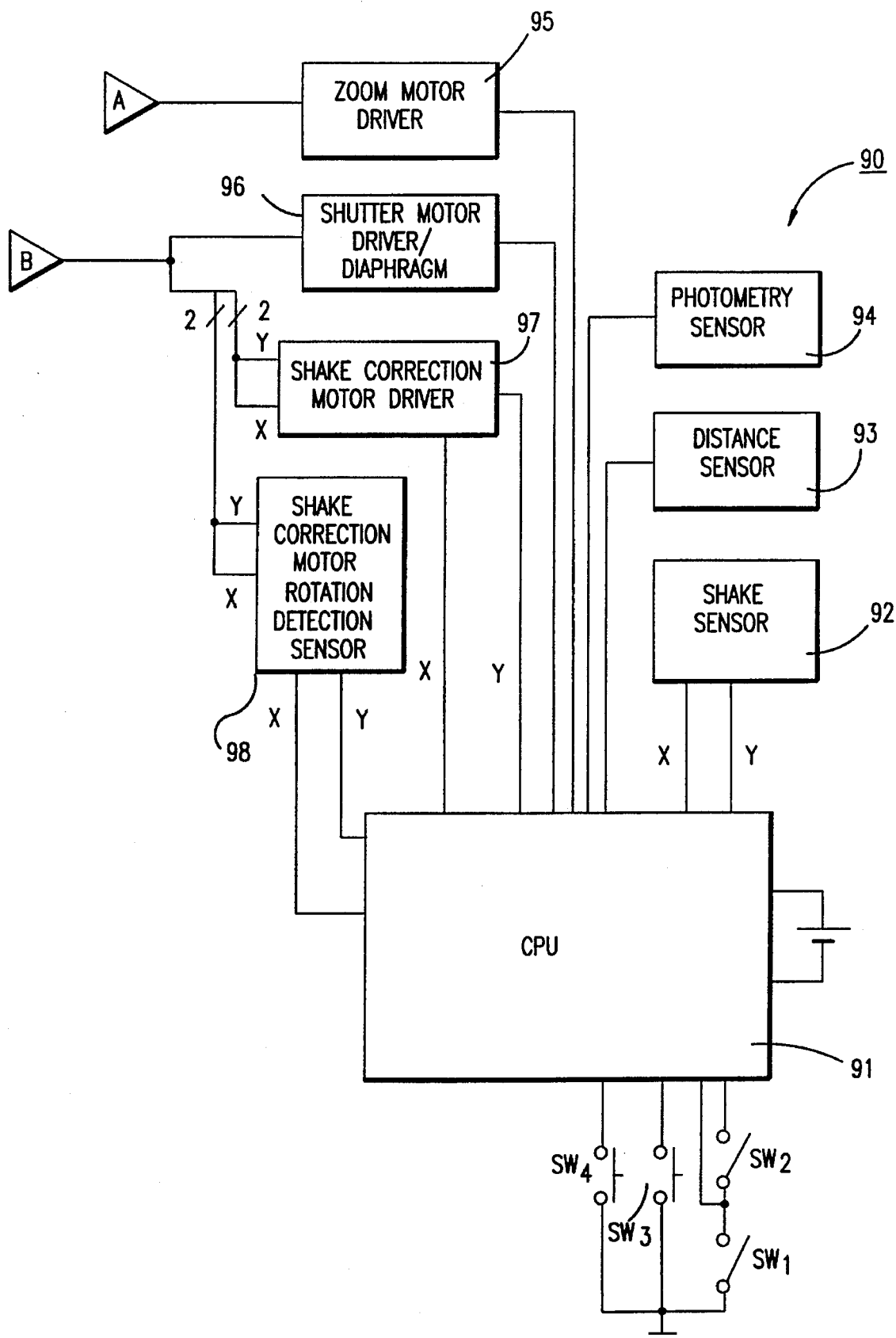
FIG. 4 shows a control mechanism for the second preferred embodiment.

A second preferred embodiment of the invention is shown in FIGS. 3 and 4. In general, the camera lens barrel 10 shown in FIG. 3 and the control system 90 shown in FIG. 4 is the same as the camera lens barrel 10 and control system 90 shown in FIGS. 1 and 2. Thus, the same reference numerals indicate the same elements.

However, as shown in FIG. 3, the focusing motor driver 36, the focusing motor 37, the rotary encoder 38, the pinion gear 39 and the ring gear 19A of the fourth lens chamber 19 have been replaced by focusing lens drive mechanism 70 extending from the shutter driver mechanism 21. The focussing lens drive mechanism 70 comprises a pin 71 connected to the shutter driver 21. The pin 71 is connected by an arm 72 to a first shaft 73. The first shaft 73 extends through slots formed in the shutter driver 21 and the first lens base plate 16 and connects to a second shaft 75 by means of a second arm 74. The second shaft 75 extends through a slot in the second lens base plate 20 and is mounted to the fourth lens chamber 19.

As shown in FIG. 3, the first and second shafts 73 and 75 extend along the optical axis of the camera lens barrel 10. The shafts 73 and 75 are positioned radially well within the outer positions of the first and second lens base plates 16 and 20. Accordingly, the diameter of the lens barrel 10 can be further reduced from that in the first preferred embodiment.

Thus, when the shutter driver 21 causes the pin 71 to move circumferentially around the optical axis, the arm 72 converts this motion into rotary motion of the shaft 73. The rotary motion of the shaft 73 is translated to the shaft 75, which causes the fourth lens chamber 19 to rotate around the optical axis. Since, as described above with respect to the first preferred embodiment, the fourth lens chamber 19 is threaded onto the second lens base plate 20, as the fourth lens chamber 19 rotates, it moves laterally along the optical axis.

In addition, shown in FIG. 4, by eliminating the rotary encoder 38 and the focusing motor 37, the focusing motor driver 36 and the focusing motor rotation detection sensor 99 can be eliminated. Thus, the construction of the controller 90 can be simplified.

Figure 5:
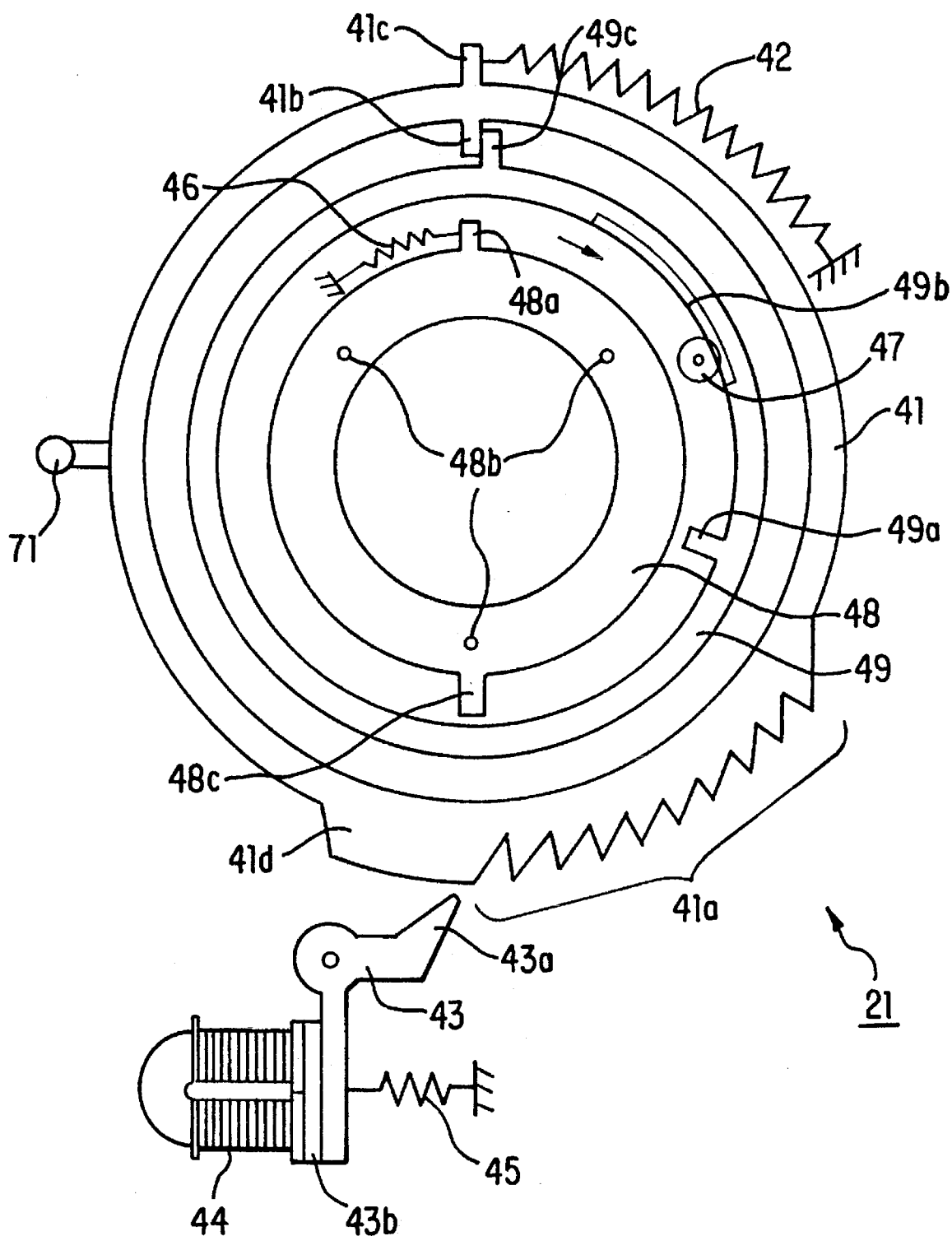
FIG. 5 shows a plan view of the diaphragm drive mechanism usable in the first and second preferred embodiments.
Figure 7:
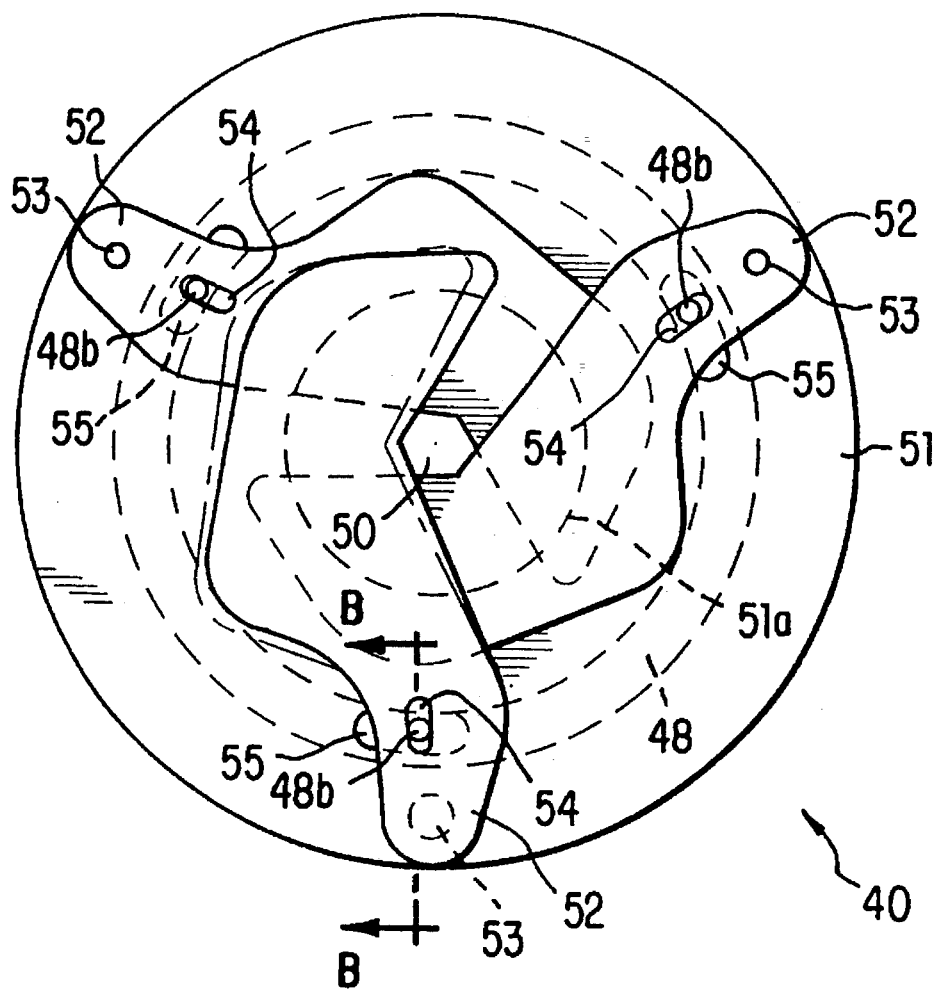
FIG. 7 shows a top plan view of the diaphragm of the first and second preferred embodiments.
Figure 8:
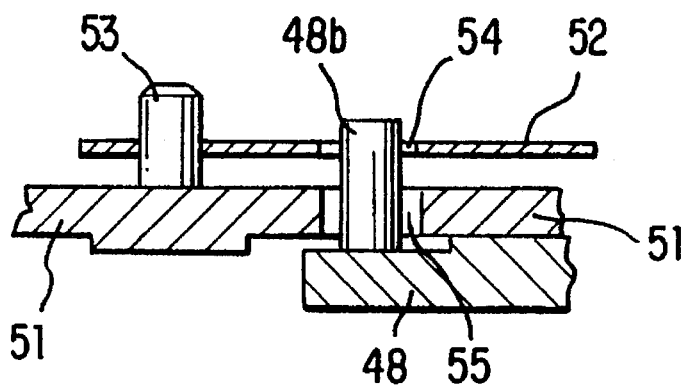
FIG. 8 shows a cross sectional portion of the diaphragm shown in FIG. 7.

FIGS. 5, 7 and 8 show the construction of the shutter driver 21 and the shutter mechanism 40. As shown in FIG. 5, the shutter driver 21 comprises a pinion gear 47 connected to a stepping motor (not shown) of the shutter driver 21. Thus, the pinion gear 47 engages a rack gear 49b of a drive ring 49. Thus, as the stepping motor rotates the pinion gear 47, the drive ring 49 is rotated.

When the switch SW1 of the control system 90 is switched on, the photometry sensor 94 and the distance sensor 93 are operated to determine the amount of ambient light and the distance to the subject to be photographed. When switch SW2 is turned on, the stepper motor is turned on and rotates to rotate the drive ring 49 in the clockwise or counterclockwise direction. The direction in which the drive ring 49 is rotated depending upon its current state and the outputs from the photometry sensor 94 and distance sensor 93.

When the drive ring 49 is rotated in a counterclockwise direction, a limiter 49c engages a limiter 41b which extends inwardly from the focusing ring 41. Since the drive ring 49 is rotated clockwise, the focusing ring 41 is pulled in the clockwise direction by the tension spring 42. When the desired amount of rotation of the stepping motor of the shutter driver 21 has been reached, as calculated from the distance measured by the distance sensor 93, an electric current is removed from the electromagnet 44, thus freeing the ratchet 43.

The electromagnet 44, when it is energized, attracts the arm 43a of the ratchet 43, thus causing it to rotate in a clockwise direction against the tension in the spring 45. Thus, when the electromagnet 44 is deenergized, the spring 45 pulls the arm 43b counterclockwise. This causes the ratchet portion 43a to engage the ratchet portion 41a of the focusing ring 41. Thus, the position of the focusing ring 41 is maintained without requiring the limiter 49c to engage the limiter 41b. Once the ratchet portion 43a is fitted into the ratchet 41a, thus fixing the position of the focusing ring 41, the drive ring 49 is rotated further clockwise.

As the driver ring 49 is rotated clockwise, a limiter 49a engages a limiter 48c of an aperture drive ring 48. Another limiter 48a on the aperture drive ring 48 is connected to a spring 46, which pulls the aperture drive ring 48b in a counterclockwise direction. Thus, as the drive ring 49 is moved clockwise and counterclockwise, the aperture drive ring 48 tends to follow it. As shown in FIG. 5, the aperture drive ring 48 also has a number of aperture drive pins 48b. The aperture drive pins 48b extend from the aperture drive ring 48 in a direction along the optical axis.

Thus, FIG. 7 shows the shutter mechanism from the opposite side of the shutter driver from that shown in FIG. 5. As shown in FIG. 7, the shutter mechanism 40 comprises the aperture drive ring 48, a shutter ring 51 and a number of sector blades 52. The shutter arms 52 are rotatably attached to the shutter ring 51 by pins 53. As shown in FIG. 7, the sector blades 52 overlap each other to control the size of the aperture 50. The maximum size of the aperture 50 is controlled by the center hole portion 51a of the aperture ring 51.

The aperture ring 51 has a number of arcuate holes 55 formed in it, equal to the number of aperture arms 52. As shown in FIG. 8, the aperture ring 51 rests on the aperture drive ring 48 with the aperture drive pins 48b extending through the holes 55. Similarly, as shown in FIGS. 7 and 8, the sector blades 52 have arcuate holes 54 formed in them. The holes 54 extend in a direction perpendicular to the holes 55. The aperture drive pins 48b, after extending through the holes 55 in the aperture ring 51, extend through the holes 54 in one of the shutter arms 52. This structure is shown in FIG. 8, which is a cross-sectional view through a portion of the shutter mechanism in FIG. 7. The region of this cross-sectional view shown by the section line B—B in FIG. 7.

Thus, as the aperture drive ring 48 is rotated, the sector blades 52 rotate around the rotary shafts 53, so that the sector blades 52 form the shutter and also function as the diaphragm. Thus, when the sector blades 52 are used as the diaphragm, the stepping motor of the shutter driver 21 is controlled via the shutter motor/diaphragm driver 96, which functions as both the shutter mover driver and the diaphragm driver. The shutter motor/diaphragm driver 96 is operated based on the outputs from the CPU 91 calculated from the outputs of the photometry sensor 94, so that the exposure is determined through control of the length of time the aperture 50 is open and the amount the aperture 50 is opened.

After the film is exposed the desired length of time with the desired aperture size, the shutter motor/diaphragm driver 96 operates the stepper motor of the shutter driver 21 in the opposite direction so that the focusing ring 41 and aperture drive ring 48 move in a counterclockwise direction. As the focusing ring 41 is pushed by the interaction of the perimeter 41b and the limiter 49c, the ratchet end 43a of the ratchet arm 43 disengages from the ratchet 41a. Since the limiter 49a disengages from the limiter 48c, the spring 46 pulls the aperture drive ring 48 in a counterclockwise direction. Thus, the aperture 50 formed by the sector 52 is closed.

While this description of the shutter drive and diaphragm mechanism has been described with reference to the second preferred embodiment, it should be understood that it equally applies to the first preferred embodiment, with respect to the drive ring 49, the aperture drive ring 48 and the aperture ring 51. That is, the focusing ring 41 is used only in a second preferred embodiment.

Figure 6:
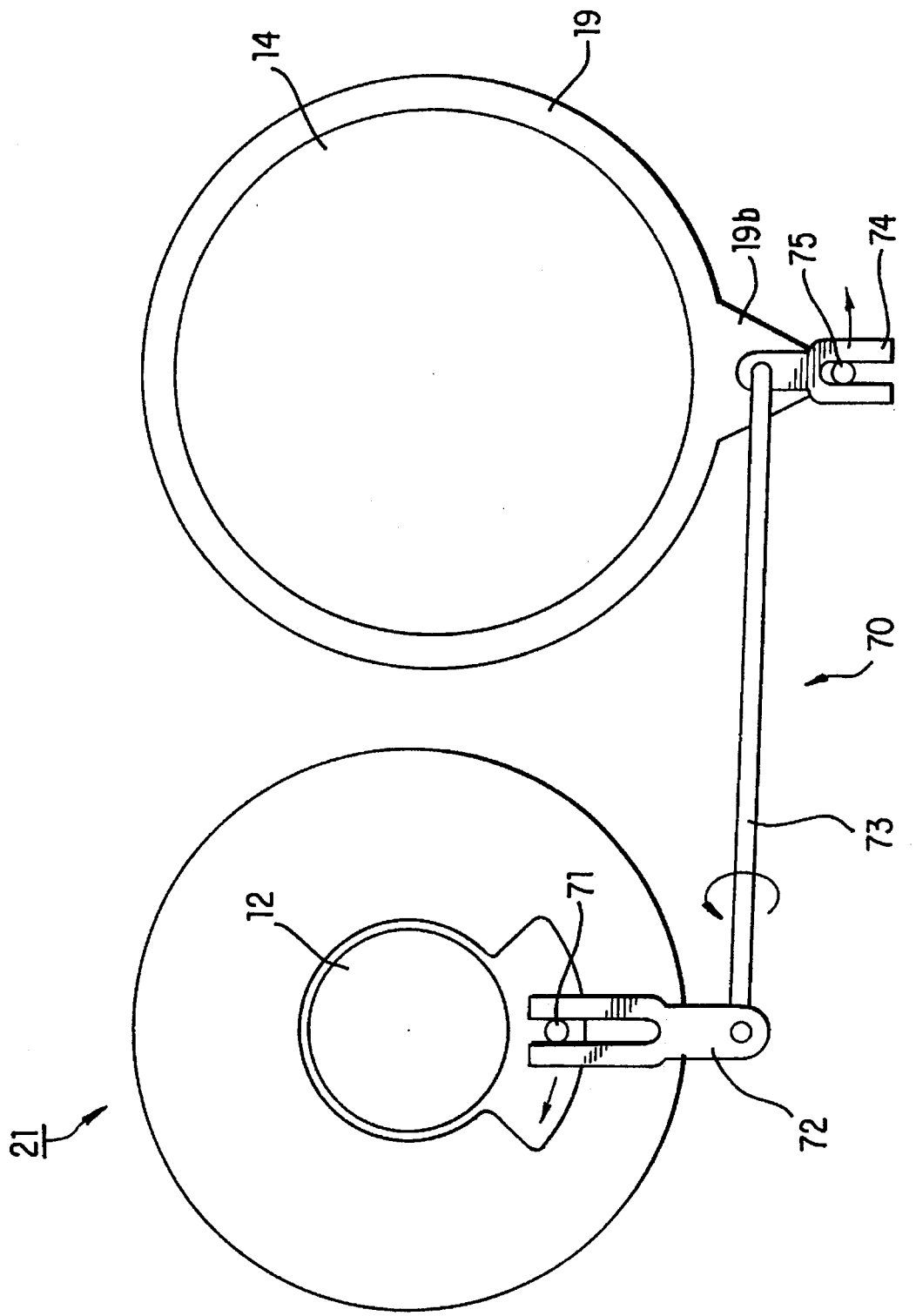
FIG. 6 shows the drive power transmission of the second preferred embodiment.

As shown in FIG. 5, the pin 71, shown in FIG. 3, extends from the focusing ring 41. FIG. 6 shows a plan view of shutter driver 21, the focussing lens drive mechanism 70 and the focusing lens 14, looking down the optical axis of the camera lens barrel 10. For ease of viewing, the elements shown in FIG. 6 have been offset laterally.

As the shutter driver 21 is rotated in the clockwise direction, the first arm 72 follows it, with the pin 71 sliding along the slot formed in the arm 72. As the arm 72 follows the pin 71, a counterclockwise rotation is placed on the first shaft 73. This counterclockwise rotation causes the second arm 74 to also rotate in the counterclockwise direction. This counterclockwise rotation of the second arm 74 forces the second shaft 75 and therefore the fourth lens chamber 19 to also move counterclockwise, with the second shaft 75 sliding along the slot formed in the second arm 74. Thus, the second arm 75 moves laterally in an arc-shaped slot formed in the second lens base plate 20. As the fourth lens chamber 19 and thus the focusing lens 14 is rotated counterclockwise relative to the second lens base plate 20, it moves along the optical axis and this changes the focal point along the optical axis.

Since the overall diameter of the shutter driver 21 is much less than that of the fourth lens chamber 19, the transmission device does not increase the overall diameter of the lens barrel 10. In addition, the transmission device 70, by replacing the motor and gearing used in the first preferred embodiment, cause a reduction in the overall diameter of the camera lens barrel 10. Thus, since in the second preferred embodiment, the focusing lens driver, which is also the shutter driver, and the focusing lens 14 are physically separated from each other, the diameter of the zoom lens barrel can be selected without being restricted by the outer diameter of the focusing lens 14. Thus, the camera lens barrel 10 can be made more compact.

In addition, because the focusing lens driver and shutter driver are placed near the shutter 40, and the distance between these elements does not change, it is possible to combine the FPC 39 for the shutter driver and the focusing lens drive mechanism into a single cable. This simplifies the structure of the FPC 39, and reduces costs.

With the camera lens barrel according to the second preferred embodiment described above, because the focusing lens 14 is focused by transmitting drive power from the shutter driver 21 located on the outer perimeter of the second lens group 12 to the fourth lens group 14, greater compactness of the camera lens barrel can be obtained while being restricted by the outer diameter of the focusing lens groups 14.

What is claimed is:

1. A camera lens barrel for a camera, comprising:

a plurality of lens groups;

a diaphragm positioned between a first lens group and a first additional lens group of the plurality of lens groups, the first lens group positioned on a first side of the diaphragm and the first additional lens group positioned on a second side of the diaphragm;

diaphragm drive means for driving the diaphragm and positioned on the first side of the diaphragm; and lens shift drive means for shifting at least the first additional lens group in a direction perpendicular to an optical axis of the camera lens barrel and positioned on the second side of the diaphragm.

2. The camera lens barrel of claim 1, wherein the diaphragm drive means, diaphragm and lens shift drive means are aligned along the optical axis.

3. The camera lens barrel of claim 1, wherein the lens shift drive means is positioned between the diaphragm drive means and a camera body of a camera.

4. The camera lens barrel of claim 1, further comprising a second additional lens group of the plurality of lens groups positioned on the first side of the diaphragm and further from the diaphragm than the first lens group.

5. The camera lens barrel of claim 1, further comprising a second additional lens group of the plurality of lens groups positioned on the second side of the diaphragm and further from the diaphragm than the first additional lens group.

6. The camera lens barrel of claim 5, wherein the second additional lens group comprises a focusing lens group, and the camera lens barrel further comprises focus power transmission means for transmitting drive power from the diaphragm drive means to the second additional lens group to drive the second additional lens group to a desired focus position.

7. The camera lens barrel of claim 6, wherein the focus power transmission means comprises:

a pin extending from the diaphragm drive means, the pin rotatable around the optical axis;

a first arm connected to a first end of a first shaft and having a slot, the pin riding in the slot;

a second arm connected to a second end of the first arm;

a second shaft, a first end of the second shaft riding in a slot formed in the second arm and a second end of the second shaft connected to the second additional lens group.

8. The camera lens barrel of claim 6, further comprising control means for controlling the diaphragm drive means, the lens shift drive means and the focus power transmission means; and signal lines connecting the control means to the diaphragm drive means, the lens shift drive means and the focus power transmission means.

9. A camera lens barrel for a camera, comprising:

a plurality of lens groups;

a diaphragm positioned between a first lens group and a first additional lens group of the plurality of lens groups, the first lens group positioned on a first side of the diaphragm and the first additional lens group positioned on a second side of the diaphragm;

a diaphragm driver driving the diaphragm and positioned on the first side of the diaphragm; and a lens shift driver shifting at least the first additional lens group in a direction perpendicular to an optical axis of the camera lens barrel and positioned on the second side of the diaphragm.

10. The camera lens barrel of claim 9, wherein the diaphragm driver, the diaphragm and the lens shift driver are aligned along the optical axis.

11. The camera lens barrel of claim 9, wherein the lens shift driver is positioned between the diaphragm driver and a camera body of the camera.

12. The camera lens barrel of claim 9, further comprising a second additional lens group of the plurality of lens groups positioned on the first side of the diaphragm and further from the diaphragm than the first lens group.

13. The camera lens barrel of claim 9, further comprising a second additional lens group of the plurality of lens groups positioned on the second side of the diaphragm and further from the diaphragm than the first additional lens group.

14. The camera lens barrel of claim 13, wherein the second additional lens group comprises a focusing lens group, and the camera lens barrel further comprises a focus power transmission transmitting drive power from the diaphragm driver to the second additional lens group to drive the second additional lens group to a desired focus position.

15. The camera lens barrel of claim 14, wherein the focus power transmission comprises:

a pin extending from the diaphragm drive means, the pin rotatable around the optical axis;

a first arm riding on the pin and connected to a first end of a first shaft;

a second arm connected to a second end of the first arm;

a second shaft, a first end of the second shaft riding in a slot formed in the second arm and a second end of the second shaft connected to the second additional lens group.

16. The camera lens barrel of claim 14, further comprising a controller controlling the diaphragm driver, the lens shift driver and the focus power transmission; and signal lines connecting the control means to the diaphragm driver, the lens shift driver and the focus power transmission.

* * * * *